Sept. 27, 1938. J. SOUSEDIK 2,131,527
VEHICLE TRANSMISSION CONTROL
Filed June 24, 1935
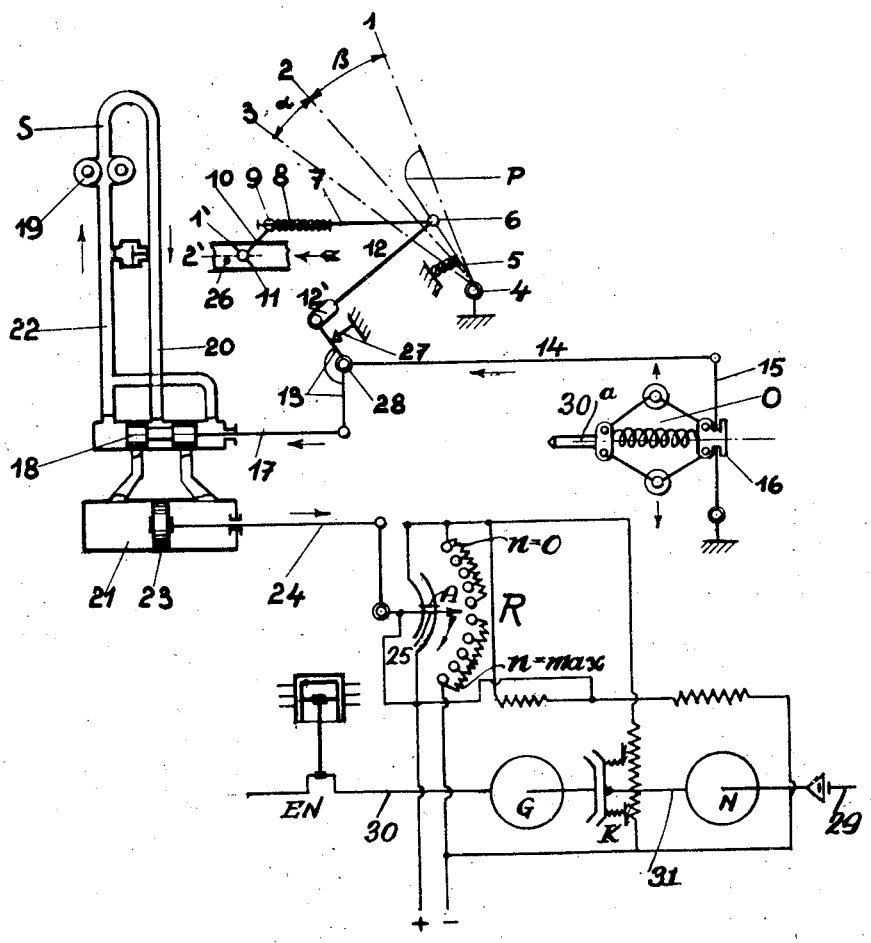
Josef Sousedik, INVENTOR.
per A. D. Fitzpatrick ATTORNEY.

Patented Sept. 27, 1938

2,131,527

UNITED STATES PATENT OFFICE 2,131,527

VEHICLE TRANSMISSION CONTROL

Josef Sousedik, Vsetin, Czechoslovakia

Application June 24, 1935, Serial No. 28,042
In Czechoslovakia December 7, 1934

8 Claims. (Cl. 290—17)

The invention relates to automatic control means for electrical transmission means in traction machines which makes it possible, on the one hand, by actuation of a single lever, to regulate the carbureter, or other output-regulating device, of an explosion or internal combustion engine and, on the other hand, to regulate a servo-motor which actuates the control and switch apparatus of the electrical transmission. The servo-motor is regulated at the same time by an automatic centrifugal governor.

By means of the apparatus according to the invention, in contrast to the hitherto known hand and foot apparatus, a very simple and reliable regulation is made possible, especially for electrical transmission means in traction machines, which are driven by an explosion or combustion engine and in which the said electrical transmission means presents an effective step-by-step or continuous regulation of the revolutions of a traction machine from zero up to maximum.

The regulation, according to the subject matter of the invention, is especially suited for electrical transmission means which, after starting, or after the desired regulation of the revolutions of the traction machine, upon reaching their maximum velocity are switched out of the drive. This may be effected by coupling the shaft of the explosion or combustion engine directly by means of an electro-magnetic coupling with the traction shaft of the vehicle.

Above all, the new regulation in accordance with the invention increases the security of operation since control of the velocity of the motor vehicle is concentrated on the ordinary accelerator foot pedal which is otherwise constructed in normal fashion.

In the accompanying drawing a constructional example of the invention is illustrated. A constant current generator G is driven by an explosion or combustion engine EM which generator can be directly coupled by an electro-magnetic coupling K to the driving motor M. The magnets of both machines G and M are supplied from an external source, for example, from an accumulator battery, and their excitation is regulated by shunts, that is, by connecting resistances in parallel with the magnets of the machines G and M by means of a regulator R.

For purposes of clearness the centrifugal governor O which is driven from the combustion engine as well as the accelerator lever P is not shown connected to the combustion engine. The accelerator lever P is pivotally mounted at the point 4 and is urged upwards in the usual manner by the spring 5. At one side of the lever P a lever 7 is pivotally attached at 6 which actuates the valve 11 provided in the induction manifold of a combustion engine EM through a joint 9 and a lever 10. The lever 7 is movable in the joint 9 and is urged away from the lever 10 by a spring 8.

Further, there is pivotally attached to the lever P at 6 a lever 12 which actuates a bell-crank lever 13 and relatively to which the lever 12 can freely move in a slot 12¹. At the same time the bell-crank lever 13 is pivotally connected with the connecting rod 14 at the point 28 and the connecting rod is pivotally connected with the lever 15 of the centrifugal governor O whose rotation is derived directly from the rotation of the explosion or combustion engine EM through the shaft 30ª. The connecting rod is movable, on change of engine revolution speed, in a horizontal direction by the operation of the centrifugal governor O through the intermediary of lever 15 and a movable sleeve 16, the movement being transferred through the bell-crank 13 to a connecting rod 17 in the servo-motor. The drawing shows diagrammatically an oil servo-motor the pump 19 of which forces the oil through the admission conduit 20 either into the left or the right hand part of the cylinder 21 according to the position of the plunger 18 and returns the oil through the conduit 22. Thereby movement of the piston 23 is caused, this movement being transferred by means of the connecting rod 24 to the contact lever 25 of the electrical transmission means regulator R. In the position shown in the drawing the whole regulating arrangement is in the middle position and the middle position of the contact lever 25 as shown corresponds to the middle velocity of the traction shaft 29 which is about half the maximum velocity, that is, about half the velocity of the shaft 30 of the combustion engine.

By depressing the accelerator lever P from position 1 into position 2 through an angle β the valve 11 fully opens, through the previously described operation of the lever 7, the induction passage of the internal combustion engine and the valve finally rests on the projection 26. Through the centrifugal force caused by the increased speed of rotation due to the opening of the valve, the centrifugal regulator O moves the connecting rod 14 and consequently also the plunger 18 towards the left so that the oil in the servo-motor S is forced into the left hand part of the cylinder 21. The piston 23 moves the connecting rod 24 to the right which turns the contact lever 25 of the regulator R up to the maximum rotation of the traction shaft. In the final position of the regulator R the lever 25 of the regulator R leaves the sliding contact A and thereby interrupts the exciting current of the electric coupling K, the field of which was connected during the period of regulation to hold the coupling in its disengaged position. The coupling, after interruption of its exciting current is engaged by spring means whereby the shaft 30 of the combustion engine EM is connected to the traction shaft 31 and 29 of the vehicle. At the same time the lever 25 cuts out the excitation of both machines G and M which thus become inoperative during the period of direct coupling between the combustion engine EM and the traction shaft of the vehicle. On return of the connecting rod 14 to the right, that is, on decrease of the engine revolutions, there occurs the desired switching-in of the electrical transmission, the clutch K being disengaged when its circuit is again closed by lever 25. When the rod 14 moves back to the right on reduction of the speed of the engine, the bell-crank lever 13 is first turned round the joint by which it is connected to the rod 17 until it contacts with the projection 27. On further movement of the rod 14 to the right, the bell crank 13 is pressed against, and turns around, the projection 27 so that it pulls the rod 17 and the plunger 18 of the servo motor to the right. Thereupon the motor moves the lever 25 from the maximum position and the electrical transmission means again comes into operation as above described. Merely by adjusting the accelerator lever P there occurs therefore through the described operation of the centrifugal governor O at a predetermined engine revolution speed a direct connection of the engine shaft 30 with the traction shaft 29. If the determined or necessary capacity of the explosion or combustion engine is exceeded by the torque, the electrical transmission can effect a greater torque on the traction shaft of the vehicle by further depressing the lever P from the position 2 into the position 3 through an angle a. During the said further depressing of lever P from position 2 into position 3 the valve 11 in the induction tube remains on the projection 28 and therefore the lever 7 is pushed through the joint 9 and the spring 8 is compressed; the latter, on release of the lever P, moving lever 7 in the reverse direction. This arrangement is necessary in view of the positive movement of the lever 12 on further depressing the lever P from position 2 to position 3 whereby the bell-crank lever 13 turns about the joint 26 in such manner that the plunger 18 is moved towards the right and thereby opens the right hand inlet of the cylinder 21 through which oil is now forced from the servo-motor so that the piston 23 is moved towards the left, that is, such that the contact lever 25 of regulator R gradually switches the electrical transmission down to the smallest revolution speed of the traction shaft.

On release of the accelerator lever P, that is, on cutting off the gas supply and lowering the engine revolution speed, the electrical transmission is automatically adjusted through the above described operation of the centrifugal governor O which now contracts into the starting position and to the greatest or any desired adjusted ratio of the electrical transmission, that is, the traction shaft makes correspondingly small number of revolutions. By a new partial depressing of the lever P there occurs first of all a gradual cutting out of the electrical transmission again through the operation of the governor O and the lever 25 as previously described which opens on increasing engine revolution speed and, when the induction tube is fully opened by further depressing the lever P into the position 2, the electrical transmission is completely cut out as previously described and finally the explosion or combustion engine is rigidly connected with the traction shaft of the vehicle by means of the electric coupling which is actuated at the same time by means of the lever 25 of the regulator R.

In the above described manner the subject matter of the invention meets all the requirements of a very simple automatic regulation and it should be noted that also by means of this regulation, mechanical transmission means in traction machines can be regulated either in step-by-step fashion or continuously, and that the regulation itself in all cases can be effected either by an electrical or mechanical interconnection of its individual main parts, that is, the servo-motor S, centrifugal governor R and the accelerator lever P.

What I claim is:—

1. In a traction vehicle including an internal combustion driving engine, a throttle valve, an operating member therefor, an infinitely variable electric power transmitter, a speed ratio resistance controller and an electromagnetic coupling for giving a mechanical straight through drive when said transmitter is cut out; automatic regulating means comprising a servo-motor including a control valve for operating said controller, a centrifugal governor driven from the engine and a connection between said governor and the control valve whereby the controller is automatically adjusted in accordance with the engine speed.

2. In a traction vehicle including an internal combustion driving engine, a throttle valve, an operating member therefor, an infinitely variable electric power transmitter, a speed ratio resistance controller and an electromagnetic coupling for giving a mechanical straight through drive when said transmitter is cut out; automatic regulating means comprising a servo-motor including a control valve for operating said controller, a centrifugal governor driven from the engine, a connection between said governor and control valve, a further connection between said valve and the said throttle operating member, and a lost motion connection between the said member and the throttle valve.

3. In a traction vehicle including an internal combustion driving engine, a throttle valve, an accelerator lever for operating said valve, an infinitely variable electric power transmitter, a speed ratio resistance controller and an electromagnetic coupling for giving a mechanical straight through drive when said transmitter is cut out; automatic regulating means comprising a servo-motor for operating said controller including a piston and a control valve, a centrifugal governor driven by the engine shaft, a double lever having a connection at one end to the control valve, a lost motion connection at the other to the accelerator lever and an intermediate connection to said governor.

4. In a traction vehicle including an internal combustion driving engine, a throttle valve, an accelerator lever for operating said valve, an infinitely variable electric power transmitter, a speed ratio resistance controller and an electromagnetic coupling for giving a mechanical straight through drive when said transmitter is cut out; automatic regulating means comprising a servo-motor for operating said controller including a piston and a control valve, a centrifugal governor driven by the engine shaft, a double lever having a connection at one end to the control valve, a lost motion connection at the other to the accelerator lever and an intermediate connection to said governor, and a lost motion connection between said accelerator lever and the throttle valve.

5. In a traction vehicle including an internal combustion driving engine, a throttle valve, an accelerator lever for operating said valve, an infinitely variable electric power transmitter, a speed ratio resistance controller and an electromagnetic coupling for giving a mechanical straight through drive when said transmitter is cut out; automatic regulating means comprising a servo-motor for operating said controller including a piston and a control valve, a centrifugal governor driven by the engine shaft, a double lever having a connection at one end to the control valve, a lost motion connection at the other to the accelerator lever and an intermediate connection to said governor, an abutment against which the throttle valve abuts in the full open position and a spring lost motion connection between said valve and the accelerator lever.

6. In a traction vehicle including an internal combustion driving engine, a throttle valve, an accelerator lever for operating said valve, an infinitely variable electric power transmitter, a speed ratio resistance controller and an electromagnetic coupling for giving a mechanical straight through drive when said transmitter is cut out; automatic regulating means comprising an oil servo-motor for operating said controller including a piston and an oil control valve, a centrifugal device driven by the engine shaft, a bell crank lever having a pivotal connection at one end to the control valve rod, a slotted lost motion connection at the other end to a link connected to the accelerator lever and an intermediate pivotal connection to the centrifugal governor, a fixed abutment against which the arm of the double lever connected to the accelerator lever abuts when the engine speed fails, an abutment against which the throttle valve abuts in the full open position, and a connecting link including a lost motion spring between said accelerator lever and the throttle to allow further operation of said lever even when the throttle is fully open.

7. In a traction vehicle including an internal combustion engine, a throttle valve, control means therefor, a driven shaft and an electrical transmission and a mechanical clutch between said engine and said shaft, said transmission including two dynamo electric machines and a field regulator by operation of which the whole load is mainly transmitted by one machine at the beginning of the starting operation and with increasing velocity the load is step-by-step switched by the regulator on to both machines until, when the starting operation is complete, the electric transmission is switched out and the engine is directly coupled with the engine shaft by said clutch; means for automatically controlling the regulator in accordance with the engine speed and the position of the throttle valve comprising a servo-motor with its piston connected to the regulator and its slide valve rod connected to one arm of a lever, a lost motion connection between the other arm of the lever and the control means, a centrifugal governor driven by the engine and a connection between same and the fulcrum of said lever.

8. In a traction vehicle as claimed in claim 7, a lost motion connection between the throttle valve and its control means whereby the latter can be moved beyond the position corresponding to full opening of the throttle valve, said further movement causing movement of the servo-motor valve and causing the motor to move the regulator from the full speed position and so switch in the electrical transmission and cut out the mechanical clutch.

JOSEF SOUSEDIK.